US008786414B2

(12) United States Patent
Nakajima et al.

(10) Patent No.: US 8,786,414 B2
(45) Date of Patent: Jul. 22, 2014

(54) COMMUNICATION DEVICE

(75) Inventors: Tetsu Nakajima, Yokohama (JP); Tomoko Adachi, Tokyo (JP); Kiyoshi Toshimitsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 13/399,080

(22) Filed: Feb. 17, 2012

(65) Prior Publication Data

US 2012/0200397 A1 Aug. 9, 2012

Related U.S. Application Data

(63) Continuation of application No. PCT/JP2009/003977, filed on Aug. 20, 2009.

(51) Int. Cl.
*G05B 11/01* (2006.01)

(52) U.S. Cl.
USPC .................... 340/12.52; 340/12.22; 340/12.3; 340/12.5; 340/12.53; 398/112

(58) Field of Classification Search
USPC ......... 340/3.1, 3.52, 3.54, 10.3, 10.32, 10.33, 340/10.34, 12.22, 12.3, 12.5, 12.52, 12.53; 398/112
See application file for complete search history.

(56) References Cited

U.S. PATENT DOCUMENTS

| | | | | |
|---|---|---|---|---|
| 5,132,679 | A * | 7/1992 | Kubo et al. | 340/12.5 |
| 5,488,357 | A * | 1/1996 | Sato et al. | 340/12.31 |
| 6,107,698 | A * | 8/2000 | Ochiai et al. | 307/43 |
| 8,023,244 | B2 * | 9/2011 | Pacull | 361/160 |
| 2005/0190306 | A1 * | 9/2005 | Lee | 348/734 |
| 2010/0056054 | A1 | 3/2010 | Yamato et al. | |
| 2011/0001887 | A1 * | 1/2011 | Shintani et al. | 348/734 |

FOREIGN PATENT DOCUMENTS

| | | | |
|---|---|---|---|
| JP | 2007-274088 | A | 10/2007 |
| JP | 2008-98893 | A | 4/2008 |
| JP | 2010-88101 | A | 4/2010 |

* cited by examiner

*Primary Examiner* — Andrew Bee
(74) *Attorney, Agent, or Firm* — Holtz Holtz Goodman & Chick PC

(57) ABSTRACT

A communication device includes a first receiver, a second receiver, a communication module, and a controller. The first receiver receives an operation signal from a remote controller. The second receiver receives a radio signal with a specific frequency. A power consumption of the second receiver is less than that of the first receiver. The communication module is capable of transmitting the operation signal to a first communication device. The controller controls power supply to the first receiver and the communication module and starts power supply to the first receiver and the communication module if the second receiver receives the radio signal. The communication module turns to a standby state if the first receiver does not receive the operation signal after start of power supply to the first receiver.

14 Claims, 5 Drawing Sheets

COMMUNICATION DEVICE

CROSS REFERENCE TO RELATED APPLICATION(S)

This is a Continuation Application of PCT Application No. PCT/JP2009/003977, filed on Aug. 20, 2009, which was published under PCT Article 21(2) in Japanese, the entire contents of which are incorporated herein by reference.

FIELD

One or more embodiments of the present invention relate to a communication device.

BACKGROUND

There is a technique for transmitting a command signal received from a remote controller to another device. However, in this technique, power saving cannot be achieved satisfactorily because one device receiving the command signal from the remote controller and the other device receiving the transmitted command signal must be powered on.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

According to one embodiment, there is provided a communication device including a first receiver, a second receiver, a communication module, and a controller. The first receiver receives an operation signal from a remote controller. The second receiver receives a radio signal with a specific frequency. A power consumption of the second receiver is less than that of the first receiver. The communication module is capable of transmitting the operation signal to a first communication device. The controller controls power supply to the first receiver and the communication module and starts power supply to the first receiver and the communication module if the second receiver receives the radio signal. The communication module turns to a standby state if the first receiver does not receive the operation signal after start of power supply to the first receiver.

One or more exemplary embodiments of the invention will be described below.

First Exemplary Embodiment

Figure 1:
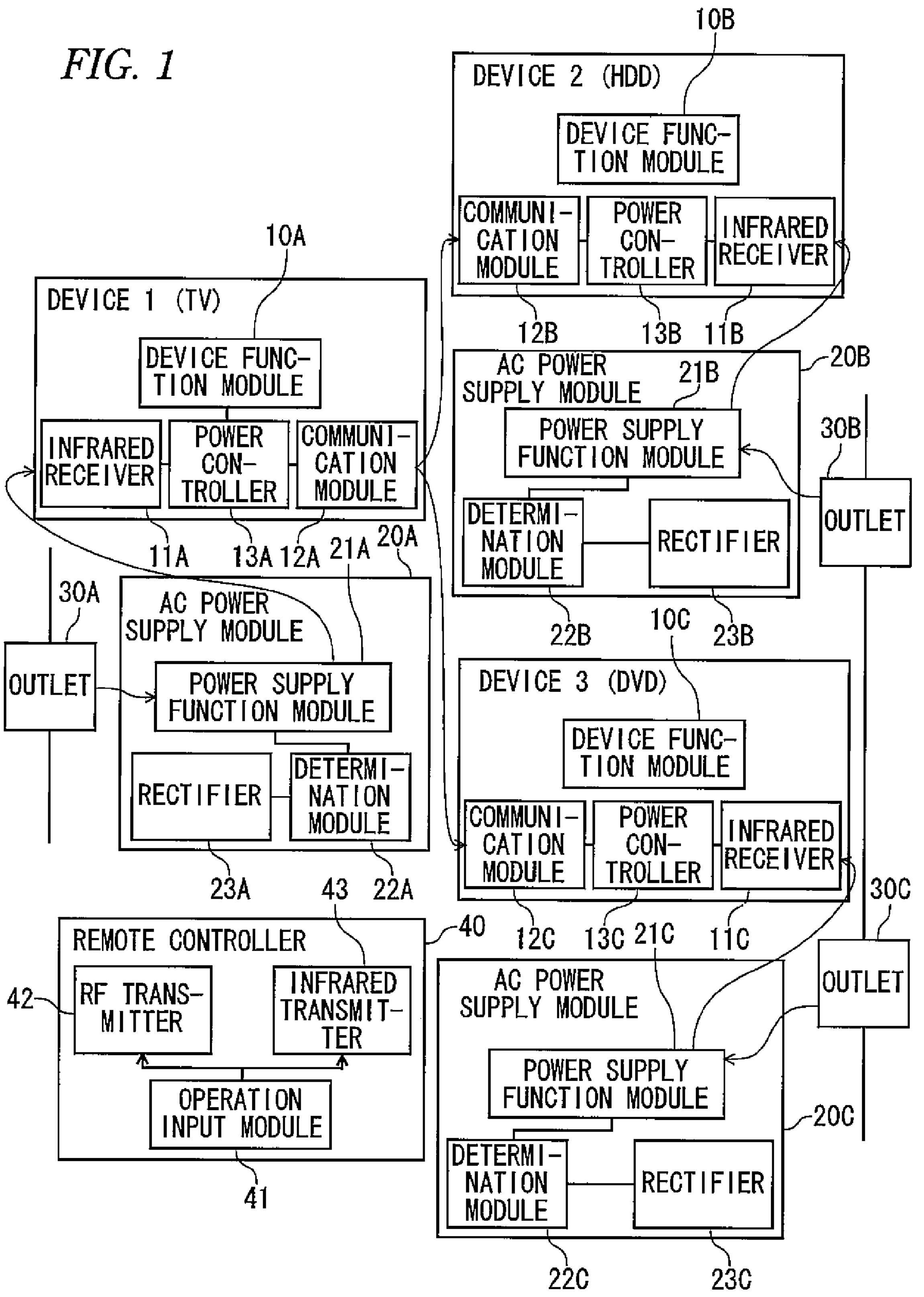
FIG. 1 is a diagram showing communication devices.

FIG. 1 is a diagram showing configuration of a communication system according to a first exemplary embodiment. The communication system includes a device 1 (TV), a device 2 (storage device: HDD), a device 3 (DVD recorder), and a remote controller 40 (remotely operating device) which remotely operates these devices. For example, the device 1 may be a personal computer, a cellular phone, a home appliance (refrigerator) having a display device (display), etc. Each of the devices 2 and 3 may be a DVD player, a personal computer, a game machine, a router, etc.

The devices 1 and 2 are connected to each other by wire 5. The devices 1 and 3 are connected to each other by wire 5. The devices 1 and 2 and the devices 1 and 3 may be connected by wireless using a frequency band such as a millimeter wave band (30 GHz to 300 GHz).

The devices 1, 2 and 3 have device function modules 10A to 10C, infrared receivers 11A to 11C, communication modules 12A to 12C, and power controllers 13A to 13C, respectively. The device function modules 10A to 10C have ordinary functions of a TV, an HDD and a DVD recorder, respectively. The infrared receivers 11A to 11C receive an operation signal from the remote controller 40 by infrared rays. The communication modules 12A to 12C perform communication among the devices. The power controllers 13A to 13C perform control as to whether the device function modules 10A to 10C, the infrared receivers 11A to 11C and the communication modules 12A to 12C are to be supplied with power or not.

The remote controller 40 has an operation input module 41, an RF transmitter 42, and an infrared transmitter 43. The operation input module 41 inputs operation of the devices 1, 2 and 3 by user's button inputting or the like. The RF transmitter 42 transmits a specific frequency band radio signal (hereinafter referred to as start-up signal) rectified by rectifiers 23A to 23C. The start-up signal may be any signal as long as the signal is for starting up each device. The start-up signal may include an identifier (ID) of a device or the like to be remotely operated. The infrared transmitter 43 transmits an operation signal for operating each device by infrared rays. The remote controller 40 transmits an operation signal if a certain period of time has passed after transmission of the start-up signal.

The devices 1, 2 and 3 are connected to outlets 30A, 30B and 30C through AC power supply modules 20A to 20C, respectively. The AC power supply modules 20A to 20C have power supply function modules 21A to 21C, determination modules 22A to 22C and the rectifiers 23A to 23C, respectively. The power supply function modules 21A to 21C have ordinary AC power supply functions respectively. The power supply function modules 21A to 21C supply power to the devices 1, 2 and 3 respectively. The rectifiers 23A to 23C receive (rectify) a radio signal (electric wave) of a specific frequency band (such as RF (Radio Frequency) band). The rectifiers 23A to 23C can be driven with feeble electric power. The determination modules 22A to 22C determine whether the identifier included in the radio signal inputted to each of the rectifiers 23A to 23C indicates its own station (or a group or system including its own station) or not. Any identifier may be used as long as the identifier is information by which its own station or a group or system including its own station can be identified.

Figure 2:
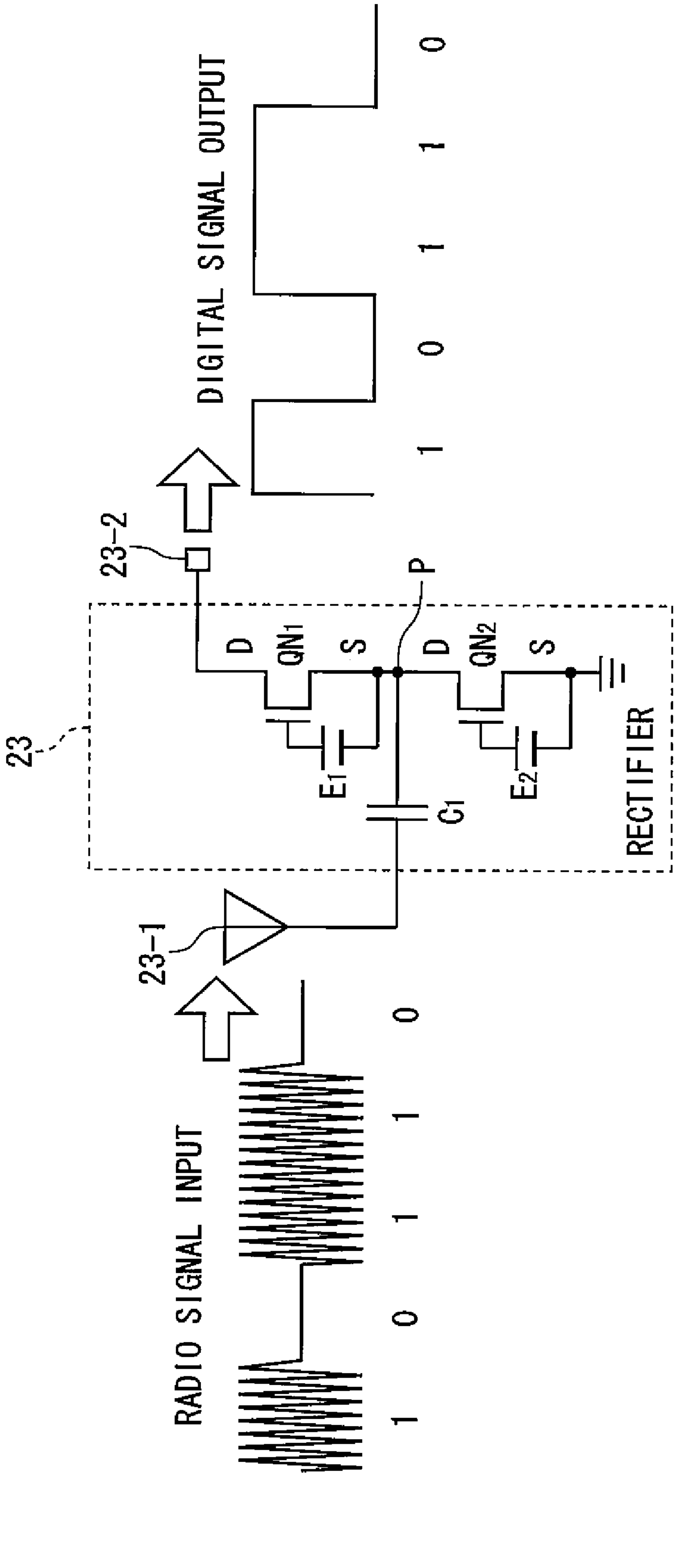
FIG. 2 is a diagram showing configuration and operation of each rectifier.

FIG. 2 is a diagram showing configuration and operation of each rectifier 23A to 23C. The rectifier 23A to 23C (receiver)) receives (detects) a start-up signal from the remote controller. The rectifier 23A to 23C has a series configuration of nMOS transistors QN1 and QN2, voltage sources E1 and E2 which apply predetermined positive bias voltages between gates and sources (S) of the respective transistors QN1 and QN2, and a capacitor C1 which connects an antenna 23-1 and an intermediate node P between the transistors QN1 and QN2.

The start-up signal from the remote controller is intermittently inputted as an RF signal which is a carrier wave corresponding to a signal of "1" and "0", by the rectifier 23A to 23C through the antenna 23-1. As illustrated in the drawing, a digital modulated signal indicating "1" and "0" corresponding to presence/absence of the RF signal is inputted to the intermediate node P. The digital modulated signal inputted to the intermediate node P generates an output voltage (rectified voltage) between the drain (D) of the transistor QN1 and the source (S) of the transistor QN2. As a result, a digital signal having a series of "1" and "0" is outputted to the determination module 22A to 22C through an output terminal 23-2. The determination module 22A to 22C determines whether the digital signal outputted from the rectifier 23A to 23C matches with a predetermined ID or not.

If the digital signal outputted from the rectifier 23A to 23C matches with the predetermined ID, the determination module 22A to 22C instructs the power supply function module 21A to 21C to turn on the power supply. Then, the power supply function module 21A to 21C starts power supply to the infrared receiver 11A to 11C.

On the other hand, if the digital signal outputted from the rectifier 23A to 23C does not match with the predetermined ID, the determination module 22A to 22C does nothing. Then, the state goes back to a state where only the rectifier 23A to 23C is driven.

The frequency band of the start-up signal transmitted by the RF transmitter 42 of the remote controller 40 and the specific frequency band rectified by the rectifier 23A to 23C of the AC power supply module 20A to 20C have to be the same but are not limited to RF bands. The frequency band of the operation signal transmitted by the infrared transmitter 43 of the remote controller 40 and the frequency band allowed to be received by the infrared receiver 11A to 11C of each device have to be the same but are not limited to infrared bands. For example, the two frequency bands may be RF bands.

Figure 3:
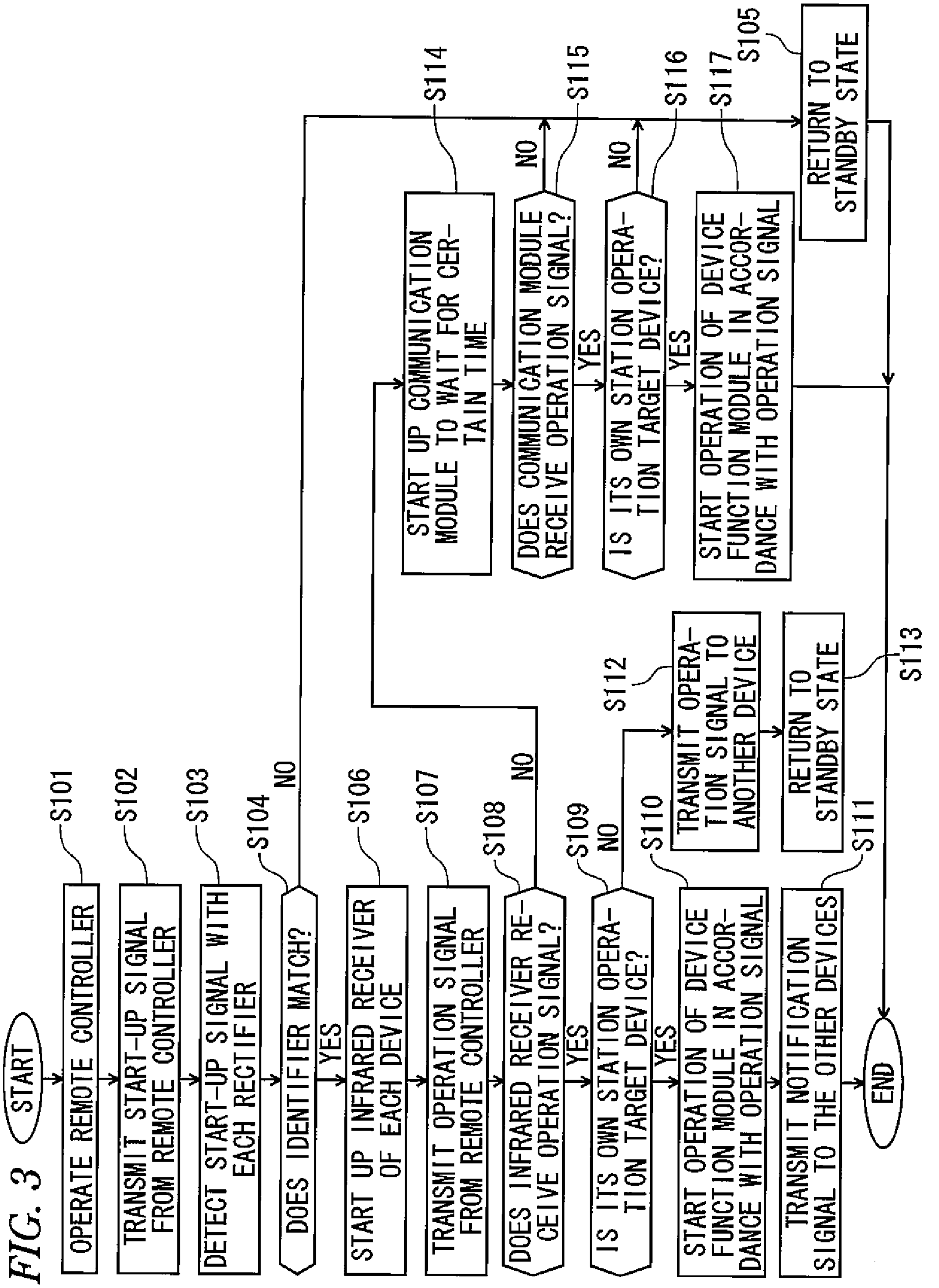
FIG. 3 is a flow chart showing operation of the communication devices.
Figure 4:
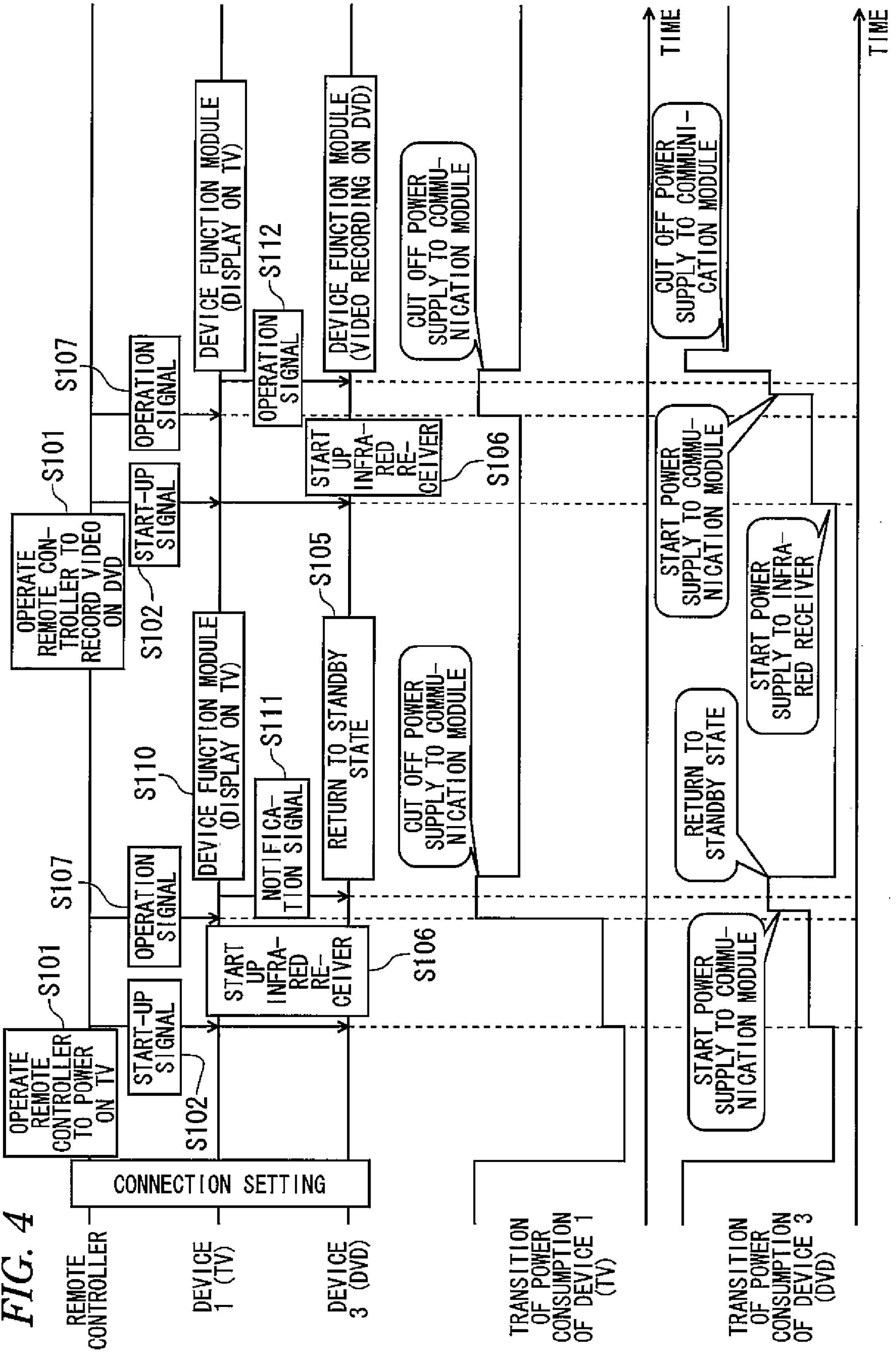
FIG. 4 is a timing chart showing operation of the communication devices.

FIG. 3 is a flowchart showing operation of the devices 1, 2 and 3 in the communication system. FIG. 4 is a timing chart showing operation and power consumption transition of the devices 1, 2 and 3 in the communication system. In the following description, it is assumed from the positional relation between the remote controller 40 and each device, etc. that the operation signal from the remote controller 40 can be received by only the device 1 and the start-up signal can be received by the devices 1, 2 and 3.

While the devices 1, 2 and 3 are on standby (the devices are inoperative to have no communication), power supply from the AC power supply modules 20A to 20C to the devices 1, 2 and 3 is cut off in order to reduce standby power. The power controllers 13A to 13C perform control for cutting off power supply to the device function modules 10A to 10C, the infrared receivers 11A to 11C, and the communication modules 12A to 12C of the devices and the power supply function modules 21A to 21C and the determination modules 22A to 22C of the AC power supply modules 20A to 20C, and further cut off power supply to the power controllers 13A to 13C themselves during standby so that all electric power supplied to the devices 1, 2 and 3 from the power supply function modules 21A to 21C of the AC power supply modules 20A to 20C is cut off. The rectifiers 23A to 23C are driven during standby to wait for a start-up signal from the remote controller 40. During standby, the rectifiers 23A to 23C may be supplied with feeble electric power from the outlets 30A, 30B and 30C or may be supplied with feeble electric power from batteries or capacitors provided in the AC power supply modules 20A to 20C. If operation is made by supply of feeble electric power from batteries or capacitors, power supply from the outlets is cut off and electric power in the power supply function modules is dropped.

In this manner, the rectifiers 23A to 23C are driven during standby but operation of the power supply function modules 21A to 21C which are optimized so that the inverter functions can operate most efficiently if the device function modules 10A to 10C of the devices 1 to 3 operate is stopped. Thus, the power supply function modules 21A to 21C need not be operated during standby so that standby power can be reduced.

First, the devices 1, 2 and 3 are on standby. A user performs an operation for powering on TV by using the operation input module 41 of the remote controller 40 in order to watch TV (step S101). The operation input module 41 sets the device 1 (TV) as an operation target device and generates an operation signal for setting "power on" as an operation.

Then, the RF transmitter 42 of the remote controller transmits a start-up signal including an ID of the communication system to which the devices 1, 2 and 3 belong (step S102). Any information may be used as the ID of the communication system as long as the communication system can be identified by the information. For example, the ID of the communication system may be a BSSID or an SSID of a wireless LAN or may be identification information of a number (with a shorter bit length than that of the BSSID or the SSID) or several bits distinguishable from adjacent systems. The ID of the communication system is given to the devices 1, 2 and 3 if setting of mutual connection (connection setting) is made for devices which belong to one communication system. At the time of connection setting of the respective devices 1, 2 and 3, the respective devices exchange encryption methods and keys and device identifiers, etc. The ID of the communication system is stored in the operation input module 41 of the remote controller 40 and the determination modules 22A to 22C of the AC power supply modules 20A to 20C of the respective devices.

Then, the rectifiers 23A to 23C of the respective devices 1, 2 and 3 receive the start-up signal. The rectifiers 23A to 23C perform a start-up signal receiving process by a method shown in FIG. 2, etc. (step S103). Then, the determination modules 22A to 22C determine whether the ID included in the start-up signal matches with the ID of the communication system including their own devices or not (step S104).

If the ID included in the start-up signal does not match with the ID of the communication system including their own devices ("No" in step S104), the devices 1, 2 and 3 return to a standby state where only the rectifiers are driven (step S105).

If the ID included in the start-up signal matches with the ID of the communication system including their own devices ("Yes" in step S104), the determination modules 22A to 22C start up the power supply function modules 21A to 21C. The power supply function modules 21A to 21C start power supply to the infrared receivers 11A to 11C of the devices (step S106). The infrared receivers 11A to 11C wait for an operation signal for a certain period after start of power supply.

Then, the infrared transmitter 43 of the remote controller 40 transmits an operation signal which is generated by the operation input module 41 for setting the device 1 (TV) as an operation target device and "power on" as an operation, with the passage of a certain time (time required until the infrared receivers become receivable after the rectifiers receive the start-up signal) after transmission of the start-up signal (step S107). The operation signal transmitted by the infrared transmitter 43 is not received by the devices 2 and 3 (HDD and DVD) ("No" in step S108) but received only by the device 1 (TV) supplied with power ("Yes" in step S108).

<Operation of Device 1 (TV)>

The infrared receiver 11A of the device 1 (TV) receives the operation signal from the remote controller 40 ("Yes" in step S108). Then, the power controller 13A determines whether its own device is the operation target device of the operation signal or not (step S109).

Because the operation target device of the operation signal is the device 1, the power controller 13A starts power supply to the device function module 10A (step S110). Then, the device function module 10A of the device 1 starts the TV function (operation).

Then, the power controller 13A starts power supply to the communication module 12A. The communication module 12A transmits, to the other devices 2 and 3, a signal for notification that the devices 2 and 3 need not start up because the operation target device is the device 1 (hereinafter referred to as notification signal) (step S111). The notification signal may be an operation signal per se, may bean instruction to power off the other devices than the operation target device or may be a signal including an identifier (an MAC address or the like) of the operation target device. Because notification that the devices 2 and 3 need not be powered on or an instruction to power off the devices 2 and 3 is given to the devices 2 and 3, wasteful waiting processes in the devices 2 and 3 are not required so that lower power consumption can be achieved.

Then, the power controller 13A turns off power supply to the communication module 12A because the device 1 need not operate to cooperate (communicate) with the other devices at the operation of the first operation signal (powering on TV).

Assume that the user further operates the remote controller 40 while watching TV so that an operation signal to record video on the DVD (operation target device: device 3 (DVD), operation: record video) is transmitted from the infrared transmitter 43.

First, because the device 1 is operative and the infrared receiver 11A has started up, the infrared receiver 11A receives as usual the operation signal from the remote controller 40 ("Yes" in step S108). Incidentally, power supply to the rectifier 23A and the determination module 22A in the AD power supply module may be cut off during operation of the device 1.

Then, because the operation target device of the operation signal is not its own station (the device 1) but the device 3 ("No" in step S109), the communication module 12A transmits (transfers) the operation signal to the device 3 through the wire 5 (step S112). The communication module 12A transmits a notification signal for notification that another device (the device 2) other than the operation target device need not start up to the other device (the device 2). The communication module 12A may transmit the operation signal received from the remote controller 40 to all connected devices directly.

Then, at the operation of the second operation signal (recording video of the DVD recorder), the power controller 13A turns off power supply to the communication module 12A because the device 1 need not operate to cooperate (communicate) with the devices 2 and 3. Because watching TV is continued, the device function module 10A of the device continues the TV function (operation). If the same operation as the operation of the second operation signal (recording video of the DVD recorder) is performed while watching TV is stopped or not made, the device 1 returns to a standby state where only the rectifier 23A is driven (step S113).

In this manner, only the respective rectifiers 23A to 23C have to be driven while the devices 1, 2 and 3 are on standby. Thus, standby power can be reduced remarkably. Moreover, since the device 1 can transmit an operation signal, the devices 2 and 3 which cannot receive the operation signal from the remote controller 40 can be operated by the remote controller 40.

<Operation of Device 2 (HDD)>

Although the infrared receiver 11B of the device 2 (HDD) waits for an operation signal from the remote controller 40 for a certain period after the start-up with a determination result of the determination module 22B as a turning point, the infrared receiver 11B cannot receive the operation signal ("No" in step S108). This occurs in the case where the device 2 is so far from the remote controller 40 that the operation signal cannot reach the device 2, the case where an obstacle is present between the remote controller 40 and the device 2 so that the infrared communication signal (operation signal) high in straightness cannot reach the device 2, the case of radio disturbance such as interference, etc.

If the infrared receiver 11B cannot receive the operation signal for the certain period, the power controller 13B starts power supply to the communication module 12B (step S114). Then, the communication module 12B waits for an operation signal or a notification signal transmitted from another device (device 1) for a certain period.

Then, the communication module 12B receives the notification signal transmitted from the device 1 ("Yes" in step S115). The power controller 13B grasps that the operation target device of the operation signal transmitted from the remote controller 40 is not its own station (device 2), based on contents written in the notification signal ("No" in step S116).

Then, the device 2 returns to a standby state where only the rectifier 23B is driven (step S105). Incidentally, the device 2 may return to a standby state if there is no signal received in the waiting period of the communication module 12B.

<Operation of Device 3 (DVD)>

Even if the infrared receiver 11C of the device 3 (DVD) waits for an operation signal from the remote controller 40 for a certain period after the start-up, the infrared receiver 11C cannot receive the operation signal like the device 2 ("No" in step S108).

If the infrared receiver 11C cannot receive the operation signal for the certain period, the power controller 13C starts power supply to the communication module 12C (step S114). Then, the communication module 12C waits for an operation signal or a notification signal transmitted from another device (the device 1) for a certain period.

At the operation of the first operation signal (powering on TV), the communication module 12C returns to a standby state (step S105) because its own station (the device 3) is not the operation target device ("No" in step S116).

At the operation of the second operation signal (recording video of the DVD recorder), the power controller 13C starts power supply to the device function module 10C (step S117) because its own station (the device 3) is the operation target device ("Yes" in step S116). Then, the device function module 10C starts a video recording operation.

Because video recording of the device 3 (DVD) need not cooperate with another device (the device 1), the power controller 13C cuts off power supply to the communication module 12C. The power controller 13C continues power supply to the infrared receiver 11C because the device function module 10C is operative.

In this manner, in the communication system according to the first exemplary embodiment, only the rectifiers are driven during standby so that standby power can be reduced remarkably. If a start-up signal is detected by the rectifiers, the power supply function modules can start power supply to the infrared receivers so that the devices do not fail to receive the operation signal from the remote controller 40.

Because the operation signal received from the remote controller 40 by the infrared receiver 11A is transmitted to another device by the communication module 12A, even the device located in a place where the operation signal cannot be received from the remote controller 40 can be operated by one remote controller 40.

If the infrared receiver 11C cannot receive an operation signal although the infrared receiver 11C waits for a certain period after start of power supply to the infrared receiver 11C, the power controller 13C starts power supply to the communication module 12C so that the communication module 12C can wait for an operation signal or a notification signal from another device. Thus, the operation signal can be received from the remote controller 40 even if the device is located in a place where the operation signal cannot be received from the remote controller 40.

If information of an operation signal concerned with preparation for transmission is received from another device while the communication module of each device is preparing for transmitting information of an operation signal received from the remote controller by the infrared receiver to the other device, the process of transmitting the information of the operation signal to the other device is stopped. While lower power consumption of each device is attained, each device can be remotely operated by one remote controller 40.

First Modification of First Exemplary Embodiment

In the aforementioned first exemplary embodiment, the power controllers 13A and 13C continue power supply to the infrared receivers 11A and 11C while the device function modules 10A and 10C are operative (during watching TV and recording video on DVD). However, the power controllers 13A to 13C can cut off power supply to the infrared receivers 11A to 11C if there is no operation of the remote controller 40 for a certain period after start of operation of the device function modules 10A to 10C.

If the infrared receivers 11A to 11C do not receive the operation signal from the remote controller 40 for the determined period during operation of the device function modules 10A to 10C, the power controllers 13A to 13C cut off power supply to the infrared receivers 11A to 11C and drive the rectifiers 23A to 23C of the AC power supply modules 20A to 20C respectively.

If the remote controller 40 is operated by the user after start of operation of the device function modules 10A to 10C and cutting off of power supply to the infrared receivers 11A to 11C, the infrared receivers 11A to 11C are started up through the rectifiers 23A to 23C based on a start-up signal transmitted by the remote controller 40 (steps S102 to S106 in FIG. 3) so that the respective devices can receive the operation signal from the remote controller 40 in the same manner as in the first exemplary embodiment.

In this manner, the infrared receivers 11A to 11C are set in a standby state if there is no operation of the remote controller 40 although the device function modules 10A to 10C are operative. Thus, it is possible to reduce power consumption.

Second Modification of First Exemplary Embodiment

In the aforementioned first exemplary embodiment, an operation such as powering on TV, recording video on DVD, etc. designated by the remote controller 40 can be processed by the device 1 or the device 3 singly. However, the operation designated by the remote controller 40 may be an operation such as DVD playback performed in connection with a plurality of devices.

In the following description, assume that an operation signal for setting the device 3 (DVD) as an operation target device and DVD playback as an operation is transmitted from the remote controller 40 while the device function module 10A of the device 1 is operative (during watching TV). Up to the following part is the same. That is, the rectifiers 23A to 23C of the devices 1, 2 and 3 detect a start-up signal from the remote controller 40 (step S103 in FIG. 3), only the infrared receiver 11A of the device 1 receives an operation signal from the remote controller 40 ("Yes" in step S108 in FIG. 3), the communication module 12A of the device 1 transmits a notification signal to the device 2 and transmits the operation signal to the device 3 (step S112 in FIG. 3), and the device function module 10C of the device 3 exerts the DVD function (step S117 in FIG. 3).

On the other hand, at the operation of the operation signal (DVD playback), the device 1 need operate in connection with the device 3. During DVD playback, the device function module 10A of the device 1 displays contents which are recorded on the DVD and which are received from the communication module 12C of the device 3 by the communication module 12A of the device 1. For this reason, the power controller 13A of the device 1 continues power supply at least to the device function module 10A and the communication module 12A. Similarly, the power controller 13C of the device 3 continues power supply at least to the device function module 10C and the communication module 12C.

Figure 5:
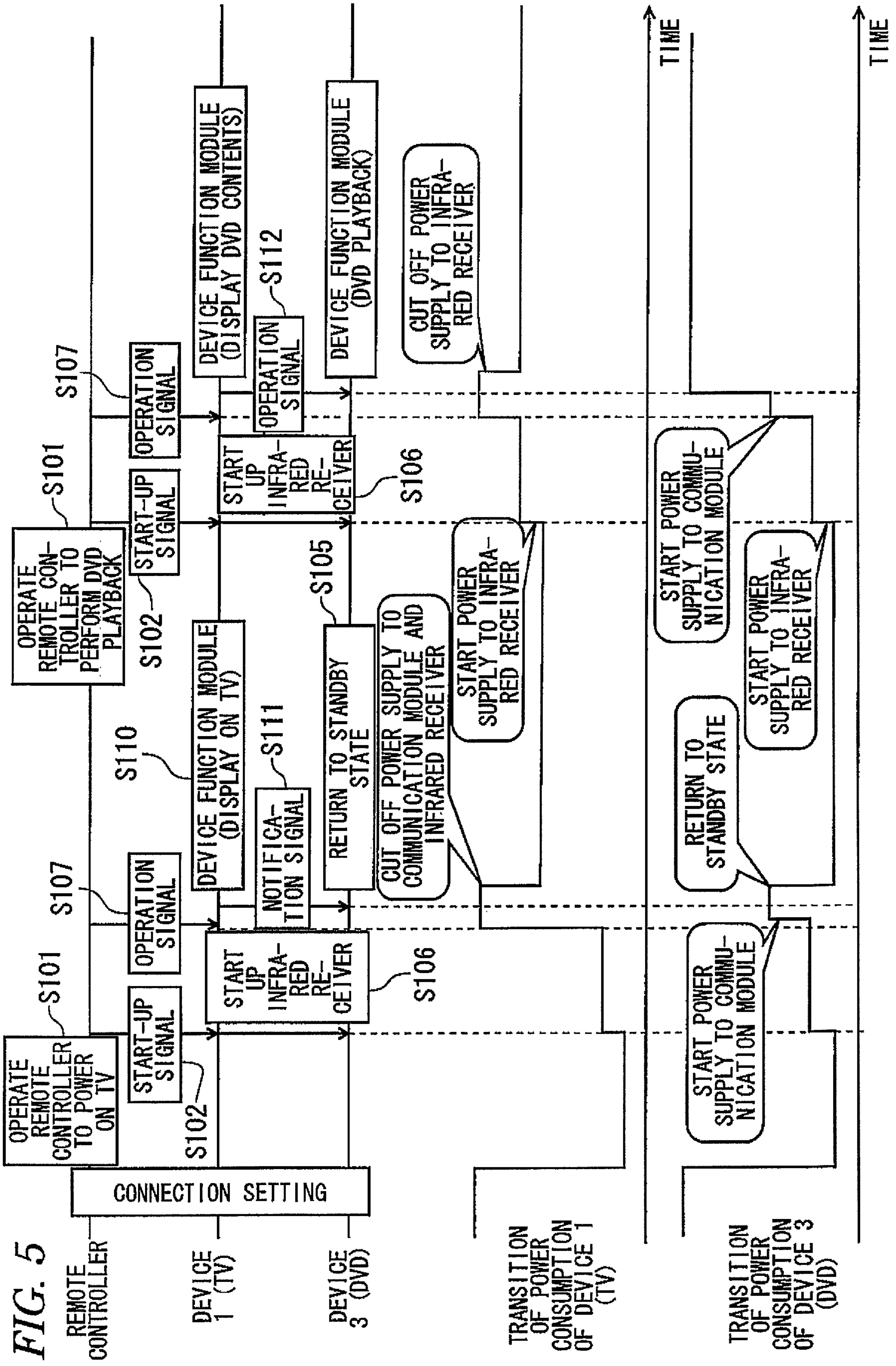
FIG. 5 is a timing chart showing operation of the communication devices.

In this manner, the power controllers 13A and 13C continue power supply to the communication modules 12A and 12C if the plurality of devices operate in connection with each other. Thus, convenience of the devices is not spoiled while power consumption is reduced. Incidentally, FIG. 5 is a timing chart showing operation of the communication system according to the first and the second Modifications of the first exemplary embodiment and transition of power consumption thereof.

Other Exemplary Embodiments

Exemplary embodiments of the invention are not limited to the aforementioned exemplary embodiment but may be extended and changed. The extended and changed exemplary embodiments are also included in the technical scope of the invention.

What is claimed is:

1. A communication device comprising:

a first receiver configured to receive an operation signal from a remote controller;

a second receiver configured to receive a radio signal with a specific frequency, a power consumption of the second receiver being less than that of the first receiver;

a communication module capable of transmitting the operation signal to another communication device; and a controller configured to control power supply to the first receiver and the communication module, wherein the controller is configured (i) to start power supply to the first receiver if the second receiver receives the radio signal, (ii) to start power supply to the communication module if, after having started power supply to the first receiver, the first receiver receives the operation signal within a certain first period of time after the start of power supply to the first receiver, and (iii) to start power supply to the communication module if, after having started power supply to the first receiver, the first period elapses and the first receiver has not yet received the operation signal.

2. The communication device according to claim 1, further comprising a determination module configured to determine whether an operation target of the operation signal received by the first receiver is the communication device or not, wherein (i) if the operation target of the operation signal is the communication device, the communication module transmits a signal for notification that the operation target of the operation signal is the communication device, to the other communication device, and (ii) if the operation target of the operation signal is not the communication device but the other communication device, the communication module transmits the operation signal to the other communication device.

3. The communication device according to claim 2, wherein if an instruction designated by the operation signal is to operate the communication device in connection with the other communication device, the controller does not cut off power supply to the communication module.

4. The communication device according to claim 3, wherein an identical group identifier is given to the communication device and the other communication device, and wherein if the second receiver receives the radio signal while there is no power supply to the first receiver, and the group identifier is included in the radio signal, the controller starts power supply to the first receiver.

5. The communication device according to claim 1, wherein the communication module is configured to transmit the operation signal to the other communication device if, after having started power supply to the first receiver, the first receiver receives the operation signal and the other communication device is an operation target of the received operation signal.

6. The communication device according to claim 1, wherein, if the first period elapses and first receiver has not yet received the operation signal and if, after having started power supply to the communication module after the first period, the first receiver does not receive the operation signal within a certain second period of time, the controller controls power supply to the communication module so that the communication module returns to a standby state.

7. The communication device of claim 1, further comprising a device function module configured to perform a device function, wherein (i) if the first receiver receives the operation signal and the communication device is the operation target of the operation signal, the controller starts power supply to the device function module, and (ii) if another operation signal is not received within a certain period of time after having started power supply to the device function module, the controller controls power supply to the first receiver so that the first receiver returns to a standby state while maintaining power supply to the device function module.

8. A power control method for a communication device which comprises (i) a first receiver configured to receive an operation signal from a remote controller, (ii) a second receiver configured to receive a radio signal with a specific frequency, a power consumption of the second receiver being less than that of the first receiver, and (iii) a communication module capable of transmitting the operation signal to another communication device, the method comprising:

controlling power supply to the first receiver and the communication module, wherein said controlling comprises:

starting power supply to the first receiver if the second receiver receives the radio signal;

starting power supply to the communication module if, after having started power supply to the first receiver, the first receiver receives the operation signal within a certain first period of time after the start of power supply to the first receiver; and starting power supply to the communication module if, after having started power supply to the first receiver, the first period elapses and the first receiver has not yet received the operation signal.

9. A communication device comprising:

a first receiver configured to receive an operation signal from a remote controller;

a second receiver configured to receive a radio signal with a specific frequency, a power consumption of the second receiver being less than that of the first receiver;

a communication module capable of transmitting the operation signal to another communication device;

a controller configured to control power supply to the first receiver and the communication module, and to start power supply to the first receiver and the communication module if the second receiver receives the radio signal; and a determination module configured to determine whether an operation target of the operation signal received by the first receiver is the communication device or not, wherein if the determination module determines that the operation target of the operation signal is the communication device, the communication module transmits a signal for notification that the operation target of the operation signal is the communication device, to the other communication device.

10. The communication device according to claim 9, wherein if the second receiver receives the radio signal while there is no power supply to the first receiver, the controller starts power supply to the first receiver, and starts power supply to the communication module after a certain period has elapsed after the start of power supply to the first receiver.

11. The communication device according to claim 10, wherein if an instruction designated by the operation signal is to operate the communication device in connection with the other communication device, the controller does not cut off power supply to the communication module.

12. The communication device according to claim 11, wherein an identical group identifier is given to the communication device and the other communication device, and wherein if the second receiver receives the radio signal while there is no power supply to the first receiver, and the group identifier is included in the radio signal, the controller starts power supply to the first receiver and the communication module.

13. The communication device according to claim 9, wherein if the determination module determines that the operation target of the operation signal is not the communication device but the other communication device, the communication module transmits the operation signal to the other communication device.

14. The communication device of claim 9, wherein the communication module returns to a standby state if the first receiver does not receive the operation signal after start of power supply to the first receiver.

* * * * *